Sept. 15, 1936.  W. A. BOUGHTON ET AL  2,054,356

BONDED PRODUCT WITH LONG TEMPERATURE RANGE BINDERS

Original Filed Oct. 1, 1934

Fig. 1.

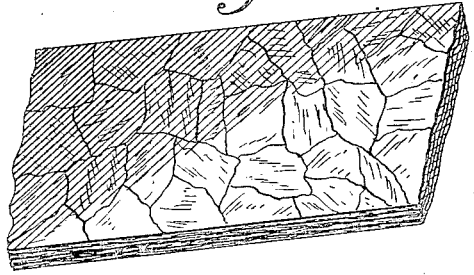

FLAKES OF MICA BONDED INTO A PLATE OR OTHER PRODUCT WITH A BINDER CONSISTING OF ASSOCIATED ORGANIC AND INORGANIC ADHESIVES.

Fig. 2.

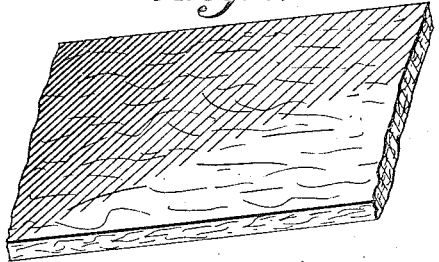

ASBESTOS SHEET OR OTHER ASBESTOS PRODUCT CONTAINING A BONDING MATERIAL MADE OF ASSOCIATED ORGANIC AND INORGANIC BONDING AGENTS.

Fig. 3.

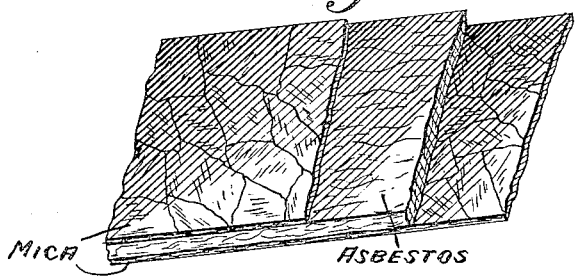

ASBESTOS SHEET OR OTHER ASBESTOS PRODUCT WITH A LAYER OR LAYERS OF MICA FLAKES ON ONE OR BOTH SURFACES ALL CEMENTED TOGETHER WITH ASSOCIATED ORGANIC AND INORGANIC BINDING AGENTS.

MICA   ASBESTOS

Fig. 4.

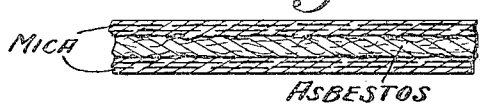

MICA   ASBESTOS

CROSS SECTION OF PRODUCT CONSISTING OF AN INNER LAYER OF ASBESTOS, AND OUTER LAYERS OF MICA FLAKES, ALL CEMENTED TOGETHER WITH ASSOCIATED ORGANIC AND INORGANIC BONDING AGENTS.

Fig. 5.

MICA   ASBESTOS

CROSS SECTION OF PRODUCT CONSISTING OF AN INNER LAYER OF MICA FLAKES AND OUTER LAYERS OF ASBESTOS, ALL CEMENTED TOGETHER WITH ASSOCIATED ORGANIC AND INORGANIC BONDING AGENTS.

Inventor:
Willis A. Boughten
and William R. Mansfield,
by Warren G. Ogden
Att'y.

Patented Sept. 15, 1936

2,054,356

UNITED STATES PATENT OFFICE 2,054,356

BONDED PRODUCT WITH LONG TEMPERATURE RANGE BINDERS

Willis A. Boughton, Cambridge, and William R. Mansfield, Boston, Mass., assignors to New England Mica Co., Waltham, Mass., a corporation of Massachusetts Original application October 1, 1934, Serial No. 746,476. Divided and this application June 27, 1935, Serial No. 28,766

14 Claims. (Cl. 154—2.6)

This invention relates to molded and bonded products containing discrete particles of solids, such for example as asbestos fibres, and mica flakes, bonded together with types of mixed binders, for example binders containing cooperating organic and inorganic constituents, the bonded products being useful in the arts, and remaining integrated over a wide range of temperatures; this application being a division from our co-pending application for Binders of mixed types, Serial Number 746,476, filed October 1st, 1934.

An object of the invention is to provide products made of discrete particles of matter bonded together with a new type of binder, the products being capable of withstanding wide temperature changes, ranging from ordinary temperatures to those approaching a red heat, without loss of integration, or impairment of other useful properties.

A further object is to provide laminated mica products, for example built-up mica sheets, bound with a new type of mixed binder, the constituents of which are cooperating organic and inorganic substances, possessing all the advantages of the well known low-temperature organic binders and also the high temperature inorganic binders, the products maintaining continuous integration over wide ranges of temperature, from ordinary temperatures up to that of thermal disintegration of mica.

A further object is to provide laminated mica products having new and useful properties over increased temperature ranges, which new properties result from the employment of new types of mixed cooperating organic-inorganic substances as binders, as described herein.

A further object is to provide laminated mica products, which when in the form of sheets, may originally possess flexibility at ordinary temperatures, thereby being adapted to be shaped as desired, and after heating retain to a large degree their bonded strength, even when heated to the decomposition temperature of mica, but which after having been heated to high temperatures lose their original flexibility upon cooling to ordinary temperatures, becoming rigid when cooled, in any desired formed shape.

A further object is to provide a mica product, for example a sheet, which at normal temperatures shall have a dielectric strength sufficient for all commercial purposes, and at higher temperatures shall possess minima of dielectric strength sufficient for all commercial purposes and also retain its integration and good mechanical properties after cooling.

A further object is to provide a laminated mica product, for example a sheet, that maintains integration and high dielectric strength at all temperatures under all conditions of service up to the point of decomposition of the mica.

A further object is to provide bonded products, for example products containing mica flakes with or without other solids, in which a variety of adhesives consisting of mixed cooperating organic and inorganic substances are used, the substances separately and collectively constituting highly efficient bonding agents, for the purpose of extending the thermal usefulness of the product and its bonding adhesive several hundred degrees with retarding of the thermal decomposition of the organic constituent of said adhesive.

Another object of the invention is to make available products, which at temperatures up to about 450° F. shall exhibit the advantages of well known organic bonded products, and at higher temperatures shall possess the advantages of the known inorganic bonded products; the new products thereby possessing the combined advantages of both the known organic and inorganic bonded products.

Other objects of the invention will be apparent to those skilled in the art upon reading the specification.

As heretofore disclosed in the following: Boughton Patent 1,975,078, Oct. 2, 1934; Boughton Patent 1,975,079, Oct. 2, 1934; Boughton and Mansfield Patent 1,975,080, Oct. 2, 1934; and Boughton Patent, No. 2,004,030, June 4, 1935, compounds of certain phosphoric acids, such as sodium metaphosphate; and also of the monoborates, such as sodium monoborate, are of great value in the compounding of inorganic adhesives, particularly in the manufacture of laminated mica products, because of the colloidal viscous nature of their aqueous solutions, and the glass-like condition of their fused forms.

In a search for new and advantageous binders for mica pieces or scales in the manufacture of laminated products, it has been discovered that adhesives of the above noted inorganic type may be mixed with certain cooperating organic adhesives, with the result that bonded products may be produced possessing the combined advantages of both the well known organic bonded type, and the inorganic bonded type; the cooperating organic and inorganic adhesives both function as adhesives over their full temperature ranges, but the discovery has been made that the point of thermal decomposition of the organic adhesive has been advanced, so that before disintegration of the usual organic bonded product would take place, the inorganic adhesive has functioned with high efficiency, producing an efficiently bonded product throughout the entire range of useful life.

The organic bonding agents, which include shellac, copal, glyptal, and various other natural as well as synthetic resins, while exhibiting excellent bonding and other properties at the lower temperatures, fail at higher temperatures because of organic thermal decomposition, charring, etc. In some instances, the inorganic bonding materials when used alone, have been found not to have such high adhesion at lower temperatures as is occasionally desirable, but at higher temperatures do, nevertheless, function as bonding media of unusual value, besides showing other useful properties.

We have discovered that by mixing binders of these two classes under certain conditions as described hereafter, a new and eminently useful group of bonding compositions can be made available in which in addition to possessing the advantages of each individual class of binders at its optimum working temperatures, the inorganic components inhibit the advance of thermal decomposition of the organic components, thereby extending their usefulness as binders; while the organic members at the lower and the inorganic members at higher temperatures function with their usual efficiency. Thus the new type of mixed binder functions to bond neutral materials and give optimum properties of the product over wider and more varied ranges of temperature than hitherto available.

As distinguished from the bonding materials of the mixed type just described, it is recognized that many general bonding and luting mixtures hitherto employed contain both organic and inorganic constituents, but in such cases the organic or the inorganic type of constituent alone is a true bonder for the particles and the other or others are present as fillers or for some other mechanical or chemical purposes. Our new bonding materials differ from all such, however, in following the fundamental criterion that for any specific variety of discrete particle bonded, not only shall both the organic and the inorganic portions of the simple mixed composition be able to function separately as a bonding medium of recognized high efficiency, but between temperatures of about 617° F. and about 797° F. the advance of thermal decomposition of the organic component is inhibited and there is a reduction in charring. Thus in one typical instance the organic portion such as shellac is a mica binder of known value, as is also the inorganic part which is essentially an aqueous colloidal association of one or more inorganic colloids of the type described in the above noted Boughton Patent 2,004,030, for example, sodium metaphosphate, with or without one or more other inorganic substances. Our new bonding mixtures invariably observe this criterion.

One of us has recently filed an application for patent on a new laminated mica plate bonded with a modern adhesive of the glyceryl borate type; (Boughton, Serial No. 661,864, filed March 20, 1933). This kind of bonding material cannot strictly be classified either as organic or inorganic, since it contains radicals of both kinds which are chemically combined. In this fact of chemical combination it is fundamentally different from mixtures involved in the present application. It does not follow the criterion stated above, because the organic radical (derived from glycerol, for example), is not in itself, a bonding material. But the chemical combination has been found to be a good binder for mica, and, therefore, can qualify in this invention as one of the constituents of a bonding mixture. Because of its amphoteric nature (containing as it does both organic and inorganic radicals in its molecule), it can be used as either the organic part or the inorganic part of a mixture of binders. This point will be further developed hereafter, where specific examples are considered. Some varieties of glyceryl phosphate also constitute an efficient binder for use in this invention.

*Advantages of composite binders*

The desirability of incorporating an inorganic constituent which is also an efficient binding agent into an organic adhesive is great with those bonded products that are required to withstand elevated temperatures, because of the superior action of the products at temperatures of organic destruction. By the dilution of the organic component with an inorganic component, a smaller amount of charring and organic decomposition takes place when the product is heated above the normal decomposition temperatures of the organic constituent. This is a novel and marked advantage. When the bond is organic alone, the bonded product is no more resistant to high temperatures than the bonding material itself. With such temperature resistant substances as mica, asbestos, and mineral wool, the bonding medium should be equally temperature resistant. This cannot happen when a purely organic binder is used.

By a suitable selection of cooperating organic and inorganic bonding components in the mixed binder, it is thus possible to extend the thermal usefulness of the bonded product as well as to maintain at higher temperatures its mechanical strength, dielectric strength, and electrical resistance, which otherwise would be lost through thermal decomposition or volatilization of an organic bond. Thus the inorganic component not only functions as a bonding agent at lower temperatures, and retards the thermal decomposition of the organic component; but continues at higher the bonding functions of adhesion and integration, when the organic component would otherwise fail more quickly through thermal decomposition or loss, and so extends the usefulness of the bonded product.

In the case of mica products, for example, laminated mica heater plate is used in flat irons and like appliances under compression. When the bond is organic alone, the binder is volatilized at the factory after the unit is assembled, leaving the mica pieces unbonded and held in position by compression only. Any disturbance of the pattern or assembly of mica pieces causes the burning out of the element. But when a cooperating inorganic bonding component is also present in the binder it maintains integration of the laminated sheets at temperatures up to that at which the mica itself decomposes, and danger of burning out and destruction of the heating element is avoided.

Similarly in the case of commutator segments and other insulating parts, if through accident or some mechanical failure the motor should be vastly overheated, the presence of the inorganic constituent in the binder will preserve integration of the mica insulation long after the organic bonding constituent has completely broken down.

It is thus seen that the present invention involves a marked improvement over prior art, and one not to be expected because all earlier experiments and all common practices in the general field of bonding had led to no such improvement in the arts of bonding as we have been able to effect by using as the cooperating inorganic constituents a member of the group of colloidal aqueous inorganic adhesives referred to in the above noted applications recently applied for by one or both of us.

In the accompanying drawing, which illustrate typical commercial products on an enlarged scale;—

Figure 1 illustrates in perspective a built-up mica plate or sheet, or other product, with a bonding agent comprising associated organic and inorganic adhesives;

Figure 2 illustrates in perspective an asbestos sheet or other asbestos product, containing a bonding agent comprising associated organic and inorganic adhesives;

Figure 3 is a view partly in perspective and partly in section, of one type of laminated product consisting of built-up mica plates and asbestos sheet, all bonded together with associated organic and inorganic adhesives; and Figures 4 and 5 are vertical sectional views of commercial laminated products consisting of layers of built-up mica plates and asbestos, all bonded together with associated organic and inorganic adhesives.

Examples

Typical examples follow. It is to be emphasized that in no case need the formula nor the conditions of use be applicable to the entire field indicated. The exact proportions and conditions may be specific only to the example cited, but all are illustrative of the application of the general principles involved, which have been fully described above. The proportions or ingredients may be altered within these general principles to suit the requirements of particular products made. In these examples Part A functions as the organic bonding constituent, and Part B as the inorganic bonding constituent of the mixture.

*Example 1.—Laminated mica heater plate*

A. 1 part shellac water varnish.
B. Colloidal sodium metaphosphate binder consisting of 2 ozs. sodium metaphosphate, 1 oz. of sodium monoborate, and 1 oz. of dipotassium orthophosphate, dissolved in water to make about 7.4 fluid ozs. (upon solution, the metaphosphate, and monoborate radical compounds form colloidal associations with water; the dipotassium orthophosphate serves to restrain crystallization or precipitation).

The shellac water varnish is a standard binding material. Using the mixture of A and B, the plate is made following any effective procedure for removing the solvent, then baking under compression at about 325° F. It is excellently bonded, and functions like the best shellac bonded plate at temperatures below that of organic decomposition. Above these temperatures the shellac is decomposed and the inorganic bonding constituent which has also functioned as a co-bonding agent, continues to keep the plate integrated and functioning as a high temperature mica product, up to temperatures at which mica itself decomposes (about 1200° F.).

*Example 2.—Another formula for this product is as follows*

A. 1 part alcoholic shellac solution (0.5 lb. per gallon). Less than 0.5% triethanolamine as mixing agent.
B. 1 part colloidal sodium metaphosphate binder as in Example 1, but with the quantities stated diluted with water to make about 14.8 fluid ozs.

*Example 3.—A third formula for this product is as follows*

A. Alcoholic shellac solution (0.5 lb. per gallon).
B. An alcoholic solution of 3.5 lbs. per gallon of glyceryl borate.

Glyceryl borate binder is made by heating about equal parts of borax and glycerol to 284° F.–320° F., when a clear hard yellowish resin is obtained. A similar binder that may be substituted for the above is made by heating about equal quantities of boric acid and glycerol to 320° F.–356° F.

The remarks under Example 1 apply here also, except that some small part of unvolatilized residual carbon is seen in the binder at 1200° F. but this does not noticeably affect the integration or the electrical properties of the product.

*Example 4.—Laminated mica flexible (cold molding) plate*

A. 1 part of an alcoholic solution of about 34° Bé. of melted mixture consisting of about 74% of rosin, and about 26% of Red engine oil; (gravity of 24.6 to 26.1, a flash-point of 385° F. to 395° F., and a viscosity at 100° F. of 223 to 230.) Less than 0.5% triethanolamine as mixing agent.
B. 1 part of an alcoholic solution of glyceryl borate as in Example 3, with 1.8% of added glycerol.

The product was of high quality in the lower temperatures, and non-flexible integration was maintained at higher temperatures up to 1200° F. This product is used in making armature slots, transformers and certain kinds of electrical heating appliances.

*Example 5.—Laminated mica plate for commutator segments*

A. 1 part shellac water varnish (as in Example 1).
B. 2 parts colloidal sodium metaphosphate binder (as in Example 2).

*Example 6.—A formula for use in making a molding, thermoplastic plate is as follows*

A. 2 parts of an alcoholic solution of shellac containing 2.25 lbs. shellac per gallon of alcohol.
B. 1 part alcoholic solution of glyceryl borate as in Example 3, with 6% by volume of added glycerol.

Such a product is used for commutator V-rings, spools, troughs, and other cold molded forms.

*Example 7.—Laminated mica flexible plate*

A. 1 part alcoholic santolite solution (2.25 lbs. per gallon).
B. 1 part alcoholic solution of glyceryl borate with added glycerol as in Example 4.

Santolite is a commercial formaldehyde-toluene sulfonamide resin.

The product was excellent and its properties duplicated those of Example 4.

Example 8.—Another formula for segment plates is as follows

A. 4 oz. Button shellac, dry.
B. 0.56 oz. sodium monoborate, dry.

The dry mixture is boiled with about 28.2 fluid ozs. of water until solution is complete. An excellent plate is produced yielding firm and clearly punched segments. Integration is maintained up to about 1200° F.

Example 9.—Asbestos sheeting

A. 1 part shellac solution (2.25 lbs. per gallon of alcohol).
B. 1 part glyceryl-monoboric acid solution. (4.5 oz. boric acid and 3.0 oz. glycerol heated to 356° F. and the reaction product then dissolved in anhydrous alcohol to make about 14.1 fluid ozs.

Sheets of long-fiber asbestos paper were impregnated with the above mixture, dried in a steam oven, rolled on a steam table, and pressed to a degree in proportion to the extent of polymerization in the binder.

Glyceryl-monoboric acid is a chemical combination which we have previously found to be a good binder for asbestos, mica, and the like; and functions as the inorganic constituent in this example.

Example 10.—Laminated asbestos and mica

A. 1 part of Bakelite XK—4043. Less than 0.5% of triethanolamine as mixing agent.
B. 1 part of colloidal sodium metaphosphate inorganic binder as in Example 1.

The Bakelite XK—4043 is a phenol formaldehyde resin solution supplied under this name by the manufacturers and is thinned with toluene to make a solution containing 2.25 lbs. of solid per gallon.

The mixture of the two components was used to impregnate two sheets of long fiber asbestos separately. Two layers of mica film were then built up on one sheet and the other sheet laid over the mica layer. The whole was then dried and heated under pressure to effect integration. Or two layers of built-up mica plate and an inner layer of asbestos could be assembled into an integral product in the same manner.

Example 11.—Molded mica powder

A. 2 parts of Mowilith N (2 ozs. Mowilith N, a commercial polymerized vinyl ester, in alcohol to make about 9.5 fluid ozs.). Less than 0.5% triethanolamine as mixing agent.
B. 1 part colloidal sodium metaphosphate binder as in Example 1.

The mica powder was treated with enough of this mixed binder to hold the particles together, and the resulting mass molded, dried, and heated to temperatures varying between about 300° F. and about 1250° F., depending on the nature of the product desired.

Example 12.—Laminated mica heater plate

A. 2 parts alcoholic shellac solution (0.5 lb. per gallon).
B. 1 part ammonium glyceryl monoborate solution (4.4 ozs. ammonium borate and about 6 ozs. glycerol heated to 275° F. and the reaction product dissolved in anhydrous alcohol to make 17.6 fluid ozs.).

Example 13.—Laminated mica plate

A. 2 parts of glyceryl borate solution (3½ lbs. to the gallon of alcohol), 1% triethanolamine as mixing agent.
B. 1 part of colloidal sodium metaphosphate binder as in Example 1.

At manufacturing temperatures in the neighborhood of 230° F. a flexible plate of excellent properties is obtained. At higher temperatures of manufacture (350° F.–480° F.) a hard plate of superior quality is formed. In this formula, the glyceryl borate functions as the organic constituent of the mixed binder.

Example 14.—Built-up mica plate, and other bonded products

A. 1 part of an alcoholic solution of about 34° Bé. of a melted mixture consisting of about 74% of rosin, and about 26% of Red engine oil as in Example 4.
1% of triethanolamine as mixing agent.
B. 1 part of sodium glyceryl metaphosphate solution (about 4.4 ozs. of sodium metaphosphate and about 6 ozs. of glycerol dissolved in water, heated to 365° F. and the reaction product dissolved in water to make about 17.6 fluid ozs.).

Example 15.—Laminated mica flexible (cold molding) plate

A. 1 part of a 2½ pounds per gallon solution of Manila copal gum in alcohol, containing approximately 8% of castor oil by volume.
B. 1 part of glyceryl borate solution as in Example 4.

The plate is made by the standard methods of manufacture, and is of high quality.

It will be understood from the description, and from the foregoing examples, that the products are bonded by an adhesive readily formed from a mixture of (A. and B.) designated organic and inorganic bonding constituents, and that either the organic or the inorganic bonding constituent of the mixture may be amphoteric in nature, that is, a chemical reaction product of organic and inorganic materials. Accordingly the terms "organic" and "inorganic", wherever found in the appended claims, should be accorded such meaning and scope within the above definition of the adhesive as the accompanying context of the claims may admit or require.

We claim:—

1. A molded product containing discrete particles, said particles bonded by an adhesive consisting of intimately mixed cooperating organic bonding material and inorganic bonding material, and the assembly thereafter being suitably baked, said cooperating organic and inorganic bonding materials being collectively and individually capable of bonding, and actually bonding, said discrete particles, said product being maintained integrated over a wide range of temperature, said inorganic bonding material inhibiting charring and thermal decomposition of said cooperating organic bonding material when heated to approximately normal decomposition temperatures, and said product remaining integrated by said cooperating inorganic component of said adhesive at temperatures above that at which said cooperating organic bonding material is destroyed.

2. A molded product, as in claim 1, in which said discrete particles consist of associated asbestos fibres and mica flakes.

3. An integrated mica product consisting of laminated mica flakes cemented together by an adhesive consisting of intimately mixed cooperating organic bonding material and inorganic bonding material, and the assembly thereafter being suitably baked, said mixed cooperating organic and inorganic bonding materials being collectively and individually capable of bonding, and actually bonding, said mica flakes, said product being maintained integrated by said adhesive over a wide range of temperature, said inorganic bonding material inhibiting charring and thermal decomposition of said organic bonding material when heated to approximately normal decomposition temperatures, and said product remaining integrated by said cooperating inorganic component of said adhesive at temperatures above that at which said organic bonding material is destroyed.

4. An integrated mica product consisting of laminated mica flakes cemented together by an adhesive consisting of the intimately mixed cooperating agents comprising shellac varnish as an organic constituent, and as an inorganic constituent a bonding aqueous association containing colloidal alkali metal metaphosphate, colloidal alkali metal monoborate, and dipotassium orthophosphate, and the assembly thereafter being suitably baked, said mixed cooperating organic and inorganic bonding materials being collectively and individually capable of bonding, and actually bonding, said mica flakes, said product being maintained integrated by said adhesive over a wide range of temperature, said inorganic constituent inhibiting charring and thermal decomposition of said shellac when heated to approximately normal decomposition temperatures, and said product remaining integrated by the cooperating inorganic components of said adhesive at temperatures above that at which said shellac varnish is destroyed.

5. An integrated mica product, as in claim 4, in which the inorganic bonding constituent comprises an aqueous association of colloidal sodium metaphosphate, colloidal sodium monoborate, and dipotassium orthophosphate.

6. An integrated mica product, as in claim 4, in which the organic bonding constituent comprises shellac-water-varnish.

7. An integrated mica product, as in claim 4, in which the organic bonding constituent comprises shellac-water-varnish, and the inorganic bonding constituent comprises an aqueous association of colloidal sodium metaphosphate, colloidal sodium monoborate, and dipotassium orthophosphate.

8. An integrated mica product consisting of laminated mica flakes cemented together by an adhesive consisting of the intimately mixed coadhesive comprising alcoholic shellac varnish as an organic constituent, and as an inorganic constituent a glyceryl borate, and the assembly thereafter being suitably baked, said mixed cooperating organic and inorganic constituents being collectively and individually capable of bonding, and actually bonding, said mica flakes, said product being maintained integrated by said adhesive over a wide range of temperatures, said borate inhibiting charring and thermal decomposition of said shellac when heated to approximately normal decomposition temperatures, and said product remaining integrated by said cooperating borate component of said adhesive at temperatures above that at which said shellac would be destroyed, and its inorganic residue functioning as a bond for said mica flakes at temperatures above that at which all organic constituents have been destroyed.

9. An integrated flexible mica product consisting of laminated mica flakes cemented together by an adhesive consisting of the intimately mixed cooperating agents comprising an alcoholic solution containing rosin and Red engine oil as an organic constituent, and as an inorganic constituent an alcoholic solution of a glyceryl borate, and the assembly thereafter being suitably baked, said mixed cooperating organic and inorganic constituents being collectively and individually capable of bonding, and actually bonding, said mica flakes, said product being maintained integrated by said adhesive over a wide range of temperatures, said borate inhibiting charring and thermal decomposition of said rosin and Red engine oil when heated to approximately normal decomposition temperatures, and said product remaining integrated by said cooperating borate component of said adhesive at temperatures above that at which said rosin and Red engine oil are destroyed, and its inorganic residue functioning as a bond for said mica flakes at temperatures above that at which all organic constituents have been destroyed.

10. An integrated flexible mica product consisting of laminated mica flakes cemented together by an adhesive containing the mixed cooperating agents comprising shellac as an organic constituent dissolved in an inorganic constituent consisting of an aqueous solution of colloidal alkali metal monoborate, and the assembly thereafter being suitably baked, said mixed cooperating organic and inorganic constituents being collectively and individually capable of bonding, and actually bonding, said mica flakes, said flexible mica product being maintained flexible and integrated by said adhesive over a wide range of temperatures, said borate inhibiting charring and thermal decomposition of said shellac when heated to approximately normal decomposition temperatures, and said product remaining integrated by the cooperating borate component of said adhesive at temperatures above that at which said shellac is destroyed.

11. An integrated flexible mica product, as in claim 10, in which the inorganic constituent consists of sodium monoborate.

12. An integrated flexible mica product, as in claim 8, in which the organic constituent comprises an alcoholic solution of Santolite, and the inorganic constituent comprises an alcoholic solution of a glyceryl borate and an excess of glycerol.

13. An integrated flexible cold molding mica product, as in claim 8, in which the organic constituent comprises an alcoholic solution of manila copal gum and castor oil, and the inorganic constituent an alcoholic solution of a glyceryl borate and an excess of glycerol.

14. Asbestos sheeting consisting of asbestos fibres saturated with an adhesive containing the mixed cooperating agents comprising an alcoholic solution of shellac as an organic constituent, and as an inorganic constituent glyceryl monoboric acid, and the assembly thereafter being suitably rolled, pressed, and baked, said cooperating organic and inorganic constituents being collectively and individually capable of bonding, and actually bonding, said asbestos fibres, said sheeting being maintained integrated by said adhesive over a wide range of temperatures, said cooperating monoboric acid constituent inhibiting charring and thermal decomposition of said shellac when heated to approximately normal decomposition temperatures, and said sheeting remaining integrated by the cooperating monoboric acid constituent of said adhesive at temperatures above that at which said shellac is destroyed, and its inorganic residue functioning as a bond for said asbestos fibres at temperatures above that at which all organic constituents have been destroyed.

WILLIS A. BOUGHTON.
WILLIAM R. MANSFIELD.